United States Patent
Ge

(10) Patent No.: US 11,741,037 B2
(45) Date of Patent: Aug. 29, 2023

(54) SINGLE-LEVEL SINGLE-LINE FULL-DUPLEX BUS COMMUNICATION METHOD AND SYSTEM

(71) Applicant: INSPUR SUZHOU INTELLIGENT TECHNOLOGY CO., LTD., Jiangsu (CN)

(72) Inventor: Zhihua Ge, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 17/798,608

(22) PCT Filed: Feb. 25, 2021

(86) PCT No.: PCT/CN2021/077802
§ 371 (c)(1),
(2) Date: Aug. 10, 2022

(87) PCT Pub. No.: WO2022/021869
PCT Pub. Date: Feb. 3, 2022

(65) Prior Publication Data
US 2023/0089760 A1 Mar. 23, 2023

(30) Foreign Application Priority Data
Jul. 27, 2020 (CN) .......................... 202010728789.8

(51) Int. Cl.
*G06F 13/40* (2006.01)
*H04L 12/40* (2006.01)

(52) U.S. Cl.
CPC .......... *G06F 13/4004* (2013.01); *H04L 12/40* (2013.01)

(58) Field of Classification Search
CPC .............................. G06F 13/4004; H04L 12/40
See application file for complete search history.

(56) References Cited

U.S. PATENT DOCUMENTS 7,133,654 B2 * 11/2006 Carballo ................ H04B 17/20
375/372
7,539,142 B1 5/2009 Gurley et al.
(Continued)

FOREIGN PATENT DOCUMENTS

CN 101084341 A 12/2007
CN 101859395 A 10/2010
(Continued)

OTHER PUBLICATIONS

International Search Report of corresponding PCT application No. PCT/CN2021/077802, dated May 19, 2021, 4 pgs.
(Continued)

*Primary Examiner* — Brian T Misiura
(74) *Attorney, Agent, or Firm* — COOPER LEGAL GROUP, LLC

(57) ABSTRACT

A single-level single-line full-duplex bus communication method and system are disclosed. The method includes: transmitting, by a first signal transceiver, data according to a first internal transmitter clock F1, simultaneously monitoring a level change on a bus, and parsing received data; transmitting, by a second signal transceiver, data according to a second internal transmitter clock F2, simultaneously monitoring the level change on the bus, and parsing received data; and communicating between the first and second signal transceivers by means of a single line, wherein the first and second transmitter clocks satisfy a relationship: F1>F2* (length of data unit+2). The system achieves single-level single-line full-duplex communication by using different coding formats and different internal transmitter clocks, whereby the number of signal lines can be reduced, single-level communication can be achieved by using universal digital levels, i.e., 0, 1, and the hardware implementation difficulty can be reduced.

18 Claims, 1 Drawing Sheet

(56) References Cited

U.S. PATENT DOCUMENTS

| | | | |
|---|---|---|---|
| 7,925,803 B2 | 4/2011 | Mangano et al. | |
| 8,521,101 B1 * | 8/2013 | Kadam | H04J 3/0685 375/350 |
| 9,673,822 B2 * | 6/2017 | Leutgeb | H03K 19/09429 |
| 9,703,737 B2 * | 7/2017 | Bagger | G06F 13/364 |
| 11,005,531 B1 * | 5/2021 | Delshadpour | H04B 3/548 |
| 11,489,695 B2 * | 11/2022 | Ngo | H04L 12/1868 |
| 2004/0233917 A1 | 11/2004 | Rocas et al. | |
| 2017/0329738 A1 * | 11/2017 | Mishra | G06F 13/4068 |
| 2020/0050575 A1 * | 2/2020 | Mishra | G06F 13/4282 |

FOREIGN PATENT DOCUMENTS

| | | |
|---|---|---|
| CN | 102591834 A | 7/2012 |
| CN | 102638338 A | 8/2012 |
| CN | 102957507 A | 3/2013 |
| CN | 103605627 A | 2/2014 |
| CN | 104520830 A | 4/2015 |
| CN | 104834625 A | 8/2015 |
| CN | 106649171 A | 5/2017 |
| CN | 107256199 A | 10/2017 |
| CN | 108429612 A | 8/2018 |
| CN | 110389924 A | 10/2019 |
| CN | 112003775 A | 11/2020 |

OTHER PUBLICATIONS

Written Opinion of International Searching Authority of corresponding PCT application PCT/CN2021/07/802, dated May 19, 2021, 9 pgs.

First Office Action of corresponding CN priority application CN202010728789.8, dated Jul. 21, 2021, 12 pages.

* cited by examiner

SINGLE-LEVEL SINGLE-LINE FULL-DUPLEX BUS COMMUNICATION METHOD AND SYSTEM

This application claims priority to Chinese Patent Application No. CN202010728789.8, filed to China Patent Office on Jul. 27, 2020 and entitled "Single-Level Single-Line Full-Duplex Bus Communication method and System", which is hereby incorporated by reference in its entirety.

FIELD

The present application relates to the field of server boards, in particular to a single-level single-line full-duplex bus communication method and system.

BACKGROUND

In the field of servers, in order to increase the interactivity and adaptability between boards, extra signals are often added between boards, whereby effective communication and mutual recognition between boards can be ensured. Boards are mostly interconnected via cables. As more signals are interacted between boards, more cables are used, and the area of a printed circuit board (PCB) occupied by a connector is also correspondingly increased, whereby hardware cost is also increased. Meanwhile, the number of connection points of the connector is increased, and the reliability of signal transmission is also reduced.

In order to reduce the number of signals between boards, serial-to-parallel conversion is generally used to convert a plurality of parallel signals into serial signals, and the signals are transmitted to another board according to a predetermined protocol, e.g. UART, I2C, SPI, and other serial buses. However, at least two physical signal lines are required by the above serial buses. In an example of an existing single-line UART, working levels thereof are 0 and 1, and the UART is single-power, but works in a half-duplex mode, whereby real-time interaction between boards cannot be ensured. However, an existing single-line full-duplex bus adopts a multi-level mode (−1, 0, 1). Both a transmitter and a receiver respectively use an ADC to sample bus data. According to the difference of multiple levels, received data is determined in combination with data transmitted thereby. The disadvantage is that the hardware scheme is complex, and unlikely to implement for a digital circuit.

SUMMARY

In order to solve the above technical problem, the present application proposes a single-level single-line full-duplex bus communication method and system, which achieve single-level single-line full-duplex communication by adopting different coding formats and different internal transmitter clocks, and improve the overall reliability of the system.

In order to achieve the above object, the present application adopts the following technical solutions.

A single-level single-line full-duplex bus communication method includes:

transmitting, by a first signal transceiver A1, data according to a first internal transmitter clock F1, simultaneously monitoring a level change on a bus, and parsing received data;

transmitting, by a second signal transceiver B1, data according to a second internal transmitter clock F2, simultaneously monitoring the level change on the bus, and parsing received data; and communicating between the first signal transceiver A1 and the second signal transceiver B1 by means of a single line, wherein the first and second transmitter clocks satisfy a relationship: F1>F2*(length of data unit+2).

Further, the first signal transceiver A1 transmits data in following coding format: data is at a high level in idle time, and a first level jump edge is generated as a start bit start at a beginning of transmission of each frame of data; in response to bit data being 1, a first level jump edge is generated correspondingly, and in response to bit data being 0, a second level jump edge is generated correspondingly; and a second level jump edge is generated as a stop bit stop after an end of transmission of data frames.

Further, at least one data unit is transmitted per frame of data, and data frames are spaced apart by a data length of at least 1 bit.

Further, the second signal transceiver B1 transmits data in following coding format: data is at a high level in idle time, and a low pulse is generated as a start bit start at a beginning of transmission of each frame of data; in response to first bit data following the start bit being 1, a low pulse is transmitted, and in response to first bit data following the start bit being 0, a low pulse is not transmitted; in response to data following the first bit data being inverted, a low pulse is transmitted, otherwise the data is kept at the high level; and a low pulse is generated as a stop bit stop after an end of transmission of data frames.

Further, at least one data unit is transmitted per frame of data, and data frames are spaced apart by a data length of at least 1 bit.

Further, any signal transceiver initiates a data interaction, another signal transceiver internally transmits a data frame to respond according to a sequence of received data frame requests, and the signal transceiver initiating the data interaction receives a response data frame of other signal transceiver according to transmitted requests.

Further, the signal transceiver transmitting a data request transmits a next frame of data request while the signal transceiver responds to other signal transceiver.

The present application also proposes a single-level single-line full-duplex bus communication system, including: a first board and a second board.

The first board includes a first complex programmable logic device (CPLD) A2, and the first CPLD A2 transmits data according to a first internal transmitter clock F1, simultaneously monitors a level change on a bus, and parses received data.

The second board includes a second CPLD B2, and the second CPLD B2 transmits data according to a second internal transmitter clock F2, simultaneously monitors the level change on the bus, and parses received data.

The first CPLD A2 and the second CPLD B2 are connected via a single signal line, and the first and second transmitter clocks satisfy a relationship: F1>F2*(length of data unit+2).

Further, the first CPLD A2 transmits data in following coding format: data is at a high level in idle time, and a first level jump edge is generated as a start bit start at a beginning of transmission of each frame of data; in response to bit data being 1, a first level jump edge is generated correspondingly, and in response to bit data being 0, a second level jump edge is generated correspondingly; and a second level jump edge is generated as a stop bit stop after an end of transmission of data frames.

Further, the second CPLD B2 transmits data in following coding format: data is at a high level in idle time, and a low pulse is generated as a start bit start at a beginning of transmission of each frame of data; in response to first bit data following the start bit being 1, a low pulse is transmitted, and in response to first bit data following the start bit being 0, a low pulse is not transmitted; in response to data following the first bit data being inverted, a low pulse is transmitted, otherwise the data is kept at the high level; and a low pulse is generated as a stop bit stop after an end of transmission of data frames.

The present application has the following beneficial effects.

The present application proposes a single-level single-line full-duplex bus communication method and system. Both parties of communication adopt different coding formats and different internal transmitter clocks, thereby achieving single-level single-line full-duplex communication, whereby the number of signal lines is reduced, the area of a PCB occupied by a connector and the cost are reduced, the number of connector contacts is also reduced, and the overall reliability of the system is improved. A full-duplex mode increases the corresponding real-time performance of data. Meanwhile, the present application can complete communication using a single level or using universal digital levels, i.e., 0, 1, thus reducing the hardware implementation difficulty.

DETAILED DESCRIPTION

Figure 1:
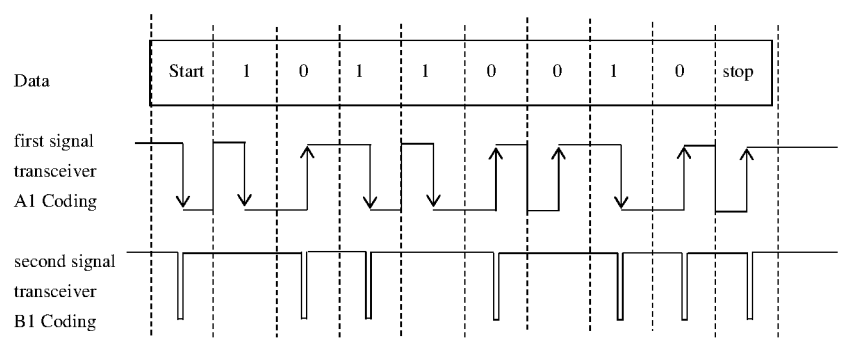
FIG. 1 is a waveform diagram of a coding format of a single-level single-line full-duplex bus communication method according to an embodiment of the present application.

In order to clearly illustrate the technical features of the present solution, the present application will be described in detail below with reference to specific implementations and drawings thereof. The following disclosure provides many different embodiments or examples for implementing different structures of the present application. In order to simplify the disclosure of the present application, components and arrangements of specific examples are described below. In addition, the present application may repeat reference numerals and/or letters in different examples. This repetition is for the purpose of simplicity and clarity and does not dictate a relationship between the various embodiments and/or arrangements discussed. It should be noted that the components illustrated in the drawings are not necessarily drawn to scale. Descriptions of well-known assemblies and processing technologies and processes are omitted in the present application to avoid unnecessarily limiting the present application.

An embodiment of the present application discloses a single-level single-line full-duplex bus communication method, characterized by including the following steps.

A first signal transceiver A1 transmits data according to a first internal transmitter clock F1, simultaneously monitors a level change on a bus, and parses received data.

A second signal transceiver B1 transmits data according to a second internal transmitter clock F2, simultaneously monitors the level change on the bus, and parses received data.

The first signal transceiver A1 and the second signal transceiver B1 communicate by means of a single line, wherein the first and second transmitter clocks satisfy a relationship: F1>F2*(length of data unit+2).

The data unit may include a plurality of bytes. In an example where one byte is included, the first and second transmitter clocks should satisfy a relationship: F1>F2*10.

Specifically, the first signal transceiver A1 transmits data in the following coding format: data is at a high level in idle time, and a first level jump edge is generated as a start bit start at the beginning of transmission of each frame of data; if bit data is 1, a first level jump edge is generated correspondingly, and if bit data is 0, a second level jump edge is generated correspondingly; and a second level jump edge is generated as a stop bit stop after the end of transmission of data frames. At least one data unit is transmitted per frame of data, and data frames are spaced apart by a data length of at least 1 bit. Optionally, when the first level jump edge is a falling edge, the second level jump edge is a rising edge. When the first level jump edge is a rising edge, the second level jump edge is a falling edge.

The second signal transceiver B1 transmits data in the following coding format: data is at a high level in idle time, and a low pulse is generated as a start bit start at the beginning of transmission of each frame of data; if first bit data following the start bit is 1, a low pulse is transmitted, and if first bit data following the start bit is 0, a low pulse is not transmitted; if data following the first bit data is inverted, a low pulse is transmitted, otherwise the data is kept at the high level; and a low pulse is generated as a stop bit stop after the end of transmission of data frames. At least one data unit is transmitted per frame of data, and data frames are spaced apart by a data length of at least 1 bit.

FIG. 1 shows waveform diagrams of a first signal transceiver A1 and a second signal transceiver B1 when transmission data is "10110010".

When the second signal transceiver B1 initiates a data interaction, the first signal transceiver A1 internally transmits a data frame to respond according to the sequence of received data frame requests, and the second signal transceiver B1 receives a response data frame of the first signal transceiver A1 according to transmitted requests. While the first signal transceiver A1 responds to the second signal transceiver B1, the second signal transceiver B1 transmits a next frame of data request.

Since the first internal transmitter clock F1 of the first signal transceiver A1 and the second internal transmitter clock F2 of the second signal transceiver B1 satisfy: F1>10*F2, the first signal transceiver A1 may transmit at least one byte of data between low pulses transmitted by the second signal transceiver B1 without causing a level conflict. For example: 10*(n+1)*F2>F1>10*n*F2, wherein n is a positive integer, and the first signal transceiver A1 may transmit at most n bytes of data between low pulses transmitted by the second signal transceiver B1.

An embodiment of the present application also discloses a single-level single-line full-duplex bus communication system, including: a first board and a second board.

The first board includes a first CPLD A2, and the first CPLD A2 transmits data according to a first internal transmitter clock F1, simultaneously monitors a level change on a bus, and parses received data.

The second board includes a second CPLD B2, and the second CPLD B2 transmits data according to a second internal transmitter clock F2, simultaneously monitors the level change on the bus, and parses received data.

The first CPLD A2 and the second CPLD B2 are connected via a single signal line, and the first and second transmitter clocks satisfy a relationship: F1>F2*(length of data unit+2). When a data unit is one byte, the first and second transmitter clocks satisfy another relationship: F1>F2*10.

Figure 2:
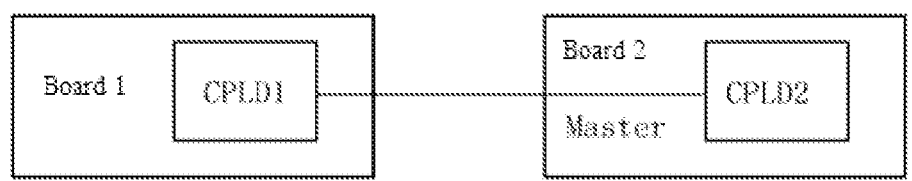
FIG. 2 is a schematic structural diagram of a single-level single-line full-duplex bus communication system according to an embodiment of the present application.

As shown in FIG. 2, the system provided in the embodiment of the present application includes a board 1 and a board 2. CPLD1 of the board 1 transmits data in the following coding format: data is at a high level in idle time, and a first level jump edge is generated as a start bit start at the beginning of transmission of each frame of data; if bit data is 1, a first level jump edge is generated correspondingly, and if bit data is 0, a second level jump edge is generated correspondingly; and a second level jump edge is generated as a stop bit stop after the end of transmission of data frames. CPLD2 of the board 2 transmits data in the following coding format: data is at a high level in idle time, and a low pulse is generated as a start bit start at the beginning of transmission of each frame of data; if first bit data following the start bit is 1, a low pulse is transmitted, and if first bit data following the start bit is 0, a low pulse is not transmitted; if data following the first bit data is inverted, a low pulse is transmitted, otherwise the data is kept at the high level; and a low pulse is generated as a stop bit stop after the end of transmission of data frames.

As a bus Master, CPLD2 firstly initiates a data interaction. CPLD1 serves as a Slave. CPLD1 starts to perform a data response with a narrow pulse transmitted by CPLD2 as a judgment condition. When CPLD2 has transmitted a frame of data request to CPLD1, CPLD2 may transmit a next frame of data request while CPLD1 responds to CPLD2, thus achieving two-way simultaneous data interaction. CPLD1 internally transmits a data frame to respond according to the sequence of received data frame requests. Correspondingly, CPLD2 receives a response data frame of CPLD1 according to transmitted requests.

Although the specific implementations of the present application have been described above with reference to the accompanying drawings, it is not intended to limit the protection scope of the present application. Other modifications or variations in different forms will be made by those skilled in the art on the basis of the above description. All implementations need not be, and cannot be, exhaustive herein. Various modifications or variations made by those skilled in the art without creative work on the basis of the technical solution of the present application still fall within the protection scope of the present application.

What is claimed is:

1. A single-level single-line full-duplex bus communication method, comprising:
    transmitting, by a first signal transceiver, data according to a first internal transmitter clock represented by F1, simultaneously monitoring a level change on a bus, and parsing received data, wherein the first signal transceiver transmits data in following coding format:
        data is at a high level in idle time, and a first level jump edge is generated as a start bit starts at a beginning of transmission of each frame of data; in response to bit data being 1, the first level jump edge is generated correspondingly, and in response to bit data being 0, a second level jump edge is generated correspondingly; and the second level jump edge is generated as a stop bit stops after an end of transmission of data frames;
    transmitting, by a second signal transceiver, data according to a second internal transmitter clock represented by F2, simultaneously monitoring the level change on the bus, and parsing received data; and
    communicating between the first signal transceiver and the second signal transceiver by means of a single line, wherein the first signal transceiver and the second signal transceiver adopt different coding formats, and wherein a length of a data unit is represented by L, and the first internal transmitter clock and the second internal transmitter clock satisfy a mathematical relationship: F1>F2*(L+2).

2. The single-level single-line full-duplex bus communication method according to claim 1, wherein at least one data unit is transmitted per frame of data, and the data frames are spaced apart by a data length of at least 1 bit.

3. The single-level single-line full-duplex bus communication method according to claim 1, wherein when any signal transceiver initiates a data interaction, another signal transceiver internally transmits a data frame to respond according to a sequence of received data frame requests, and the signal transceiver initiating the data interaction receives a response data frame of the another signal transceiver according to transmitted data frame requests.

4. The single-level single-line full-duplex bus communication method according to claim 1, wherein a signal transceiver transmitting a data request transmits a next frame of the data request while the signal transceiver responds to a second data request of another signal transceiver.

5. The single-level single-line full-duplex bus communication method according to claim 1, wherein the first internal transmitter clock and the second internal transmitter clock satisfy another relationship: F1>F2*10 in response to the data unit including one byte.

6. The single-level single-line full-duplex bus communication method according to claim 1, wherein the first level jump edge is a falling edge, while the second level jump edge is a rising edge or vice versa.

7. A single-level single-line full-duplex bus communication method, comprising:
    transmitting, by a first signal transceiver, data according to a first internal transmitter clock represented by F1, simultaneously monitoring a level change on a bus, and parsing received data;
    transmitting, by a second signal transceiver, data according to a second internal transmitter clock represented by F2, simultaneously monitoring the level change on the bus, and parsing received data, wherein the second signal transceiver transmits data in following coding format:
        data is at a high level in idle time, and a low pulse is generated as a start bit starts at a beginning of transmission of each frame of data; in response to first bit data following the start bit being 1, the low pulse is transmitted, and in response to the first bit data following the start bit being 0, the low pulse is not transmitted; in response to data following the first bit data being inverted, the low pulse is transmitted, otherwise the data is kept at the high level; and the low pulse is generated as a stop bit stops after an end of transmission of data frames; and
    communicating between the first signal transceiver and the second signal transceiver by means of a single line, wherein the first signal transceiver and the second signal transceiver adopt different coding formats, and wherein a length of a data unit is represented by L, and the first internal transmitter clock and the second internal transmitter clock satisfy a mathematical relationship: F1>F2*(L+2).

8. The single-level single-line full-duplex bus communication method according to claim 7, wherein at least one data unit is transmitted per frame of data, and the data frames are spaced apart by a data length of at least 1 bit.

9. A single-level single-line full-duplex bus communication system, comprising: a first board and a second board, wherein the first board comprises a first complex programmable logic device (CPLD), and the first CPLD transmits data according to a first internal transmitter clock represented by F1, simultaneously monitors a level change on a bus, and parses received data, wherein the first CPLD transmits data in following coding format:

data is at a high level in idle time, and a first level jump edge is generated as a start bit starts at a beginning of transmission of each frame of data; in response to bit data being 1, the first level jump edge is generated correspondingly, and in response to bit data being 0, a second level jump edge is generated correspondingly; and the second level jump edge is generated as a stop bit stops after an end of transmission of data frames;

the second board comprises a second CPLD, and the second CPLD transmits data according to a second internal transmitter clock represented by F2, simultaneously monitors the level change on the bus, and parses received data; and the first CPLD and the second CPLD are connected via a single signal line, wherein the first CPLD and the second CPLD adopt different coding formats, and a length of a data unit is represented by L, and the first internal transmitter clock and the second internal transmitter clock satisfy a mathematical relationship: $F1>F2*(L+2)$.

10. The single-level single-line full-duplex bus communication system according to claim 9, wherein the second CPLD transmits data in following coding format: data is at the high level in idle time, and a low pulse is generated as the start bit starts at the beginning of transmission of each frame of data; in response to first bit data following the start bit being 1, the low pulse is transmitted, and in response to the first bit data following the start bit being 0, the low pulse is not transmitted; in response to data following the first bit data being inverted, the low pulse is transmitted, otherwise the data is kept at the high level; and the low pulse is generated as the stop bit stops after the end of transmission of the data frames.

11. The single-level single-line full-duplex bus communication method according to claim 4, wherein the signal transceiver transmits at least one byte of data between low pulses transmitted by the another signal transceiver without causing a level conflict.

12. The single-level single-line full-duplex bus communication system according to claim 9, wherein the first internal transmitter clock and the second internal transmitter clock satisfy another relationship: $F1>F2*10$ in response to the data unit including one byte.

13. The single-level single-line full-duplex bus communication system according to claim 9, wherein the first level jump edge is a falling edge, while the second level jump edge is a rising edge or vice versa.

14. The single-level single-line full-duplex bus communication system according to claim 9, wherein at least one data unit is transmitted per frame of data, and the data frames are spaced apart by a data length of at least 1 bit.

15. The single-level single-line full-duplex bus communication system according to claim 10, wherein at least one data unit is transmitted per frame of data, and the data frames are spaced apart by a data length of at least 1 bit.

16. The single-level single-line full-duplex bus communication system according to claim 9, wherein when any signal transceiver initiates a data interaction, another signal transceiver internally transmits a data frame to respond according to a sequence of received data frame requests, and the signal transceiver initiating the data interaction receives a response data frame of the another signal transceiver according to transmitted data frame requests.

17. The single-level single-line full-duplex bus communication system according to claim 9, wherein a signal transceiver transmitting a data request transmits a next frame of the data request while the signal transceiver responds to a second data request of another signal transceiver.

18. The single-level single-line full-duplex bus communication system according to claim 17, wherein the signal transceiver transmits at least one byte of data between low pulses transmitted by the another signal transceiver without causing a level conflict.

\* \* \* \* \*